United States Patent [19]
Schwab et al.
[11] 4,181,956
[45] Jan. 1, 1980

[54] DIGITAL INDICIA GENERATOR EMPLOYING COMPRESSED DATA

[75] Inventors: Carl E. Schwab, Huntington Station; David P. Rost, Malverne, both of N.Y.

[73] Assignee: General Signal Corporation, Stamford, Conn.

[21] Appl. No.: 849,143

[22] Filed: Nov. 7, 1977

[51] Int. Cl.[2] ........................ G06F 3/14; G06F 15/20

[52] U.S. Cl. .................................... 364/521; 315/365; 340/747; 340/750; 340/803

[58] Field of Search ................ 364/521, 720; 315/365, 315/367; 346/1, 34; 340/725, 747, 750, 745, 722, 728, 799, 800, 803

[56] References Cited

U.S. PATENT DOCUMENTS

| | | | |
|---|---|---|---|
| Re. 29,351 | 8/1977 | Zuckerman et al. | 358/107 |
| 3,537,096 | 10/1970 | Hatfield | 340/725 |
| 3,605,109 | 9/1971 | Tyler et al. | 346/1 |
| 3,686,662 | 8/1972 | Blixt et al. | 340/747 |
| 3,747,087 | 7/1973 | Harrison et al. | 340/725 |
| 3,750,135 | 7/1973 | Carey et al. | 340/750 |
| 3,768,092 | 10/1973 | Dodds, Jr. et al. | 340/750 |
| 3,781,850 | 12/1973 | Gicca et al. | 340/747 |
| 3,789,200 | 1/1974 | Childress et al. | 340/747 |
| 3,792,304 | 2/1974 | Dalena et al. | 315/367 |
| 3,803,584 | 4/1974 | Hittel | 315/365 |
| 4,023,027 | 5/1977 | Strathman et al. | 364/720 |
| 4,038,668 | 7/1977 | Quarton | 364/521 |
| 4,054,919 | 10/1977 | Alcorn | 358/148 |
| 4,056,713 | 11/1977 | Quinn | 364/521 |
| 4,074,281 | 2/1978 | Quarton | 364/521 |
| 4,084,261 | 4/1978 | Laker et al. | 340/747 |

OTHER PUBLICATIONS

Fink (Textbook) Radar Engineering, McGraw-Hill Book Company, 1947, pp. 536-548.

*Primary Examiner*—Felix D. Gruber

[57] ABSTRACT

A display indicia generator driven by compressed data is arranged to draw indicia on a display coordinated with signals from an external environment. For drawing a line, for example, the compressed data includes coordinates of a point on the line, a slope of the line and a length of the line. The display includes a deflection system for deflecting a writing beam, such as a cathode ray beam, over the display area in a predetermined pattern, i.e., a raster scan or PPI display. The signal source for the external signals to be displayed is coupled via a mixer to the unblanking control of the display. Another input to the mixer comes from the indicia generator which is arranged to enable the beam when it reaches a point, such as the start point on the line. On each succeeding coordinate scan, counters keep track of the portion of the sweep during which the beam should be unblanked so as to display the line. At the completion of the frame, the indicia has been generated concurrently with the signals. Both raster scan and PPI scan embodiments are disclosed.

18 Claims, 22 Drawing Figures

FIG. 6
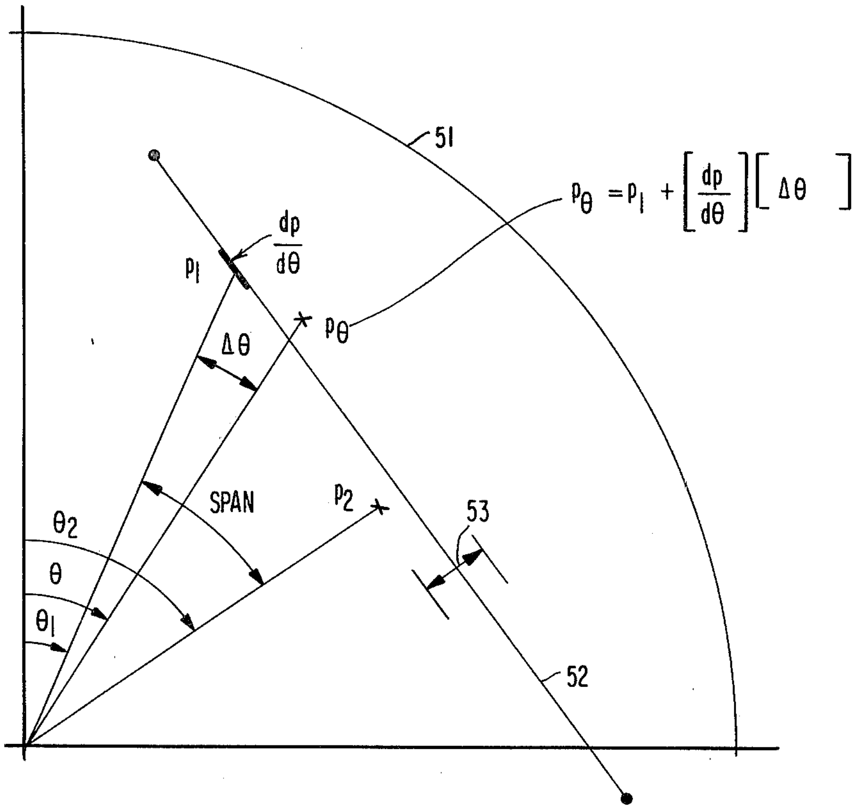
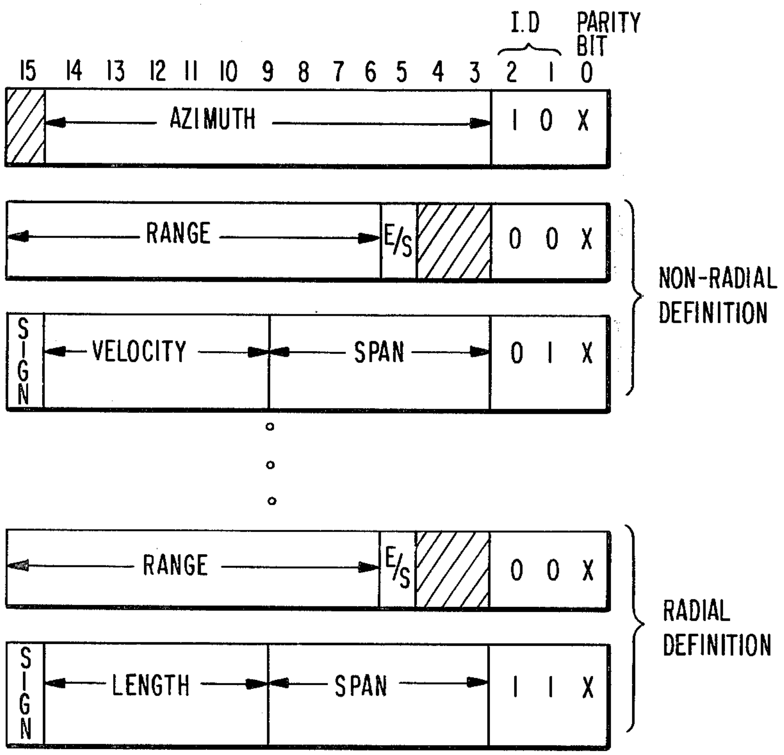
FIG. 7A
FIG. 7B
FIG. 7C
FIG. 7D
FIG. 7E

FIG 13 A
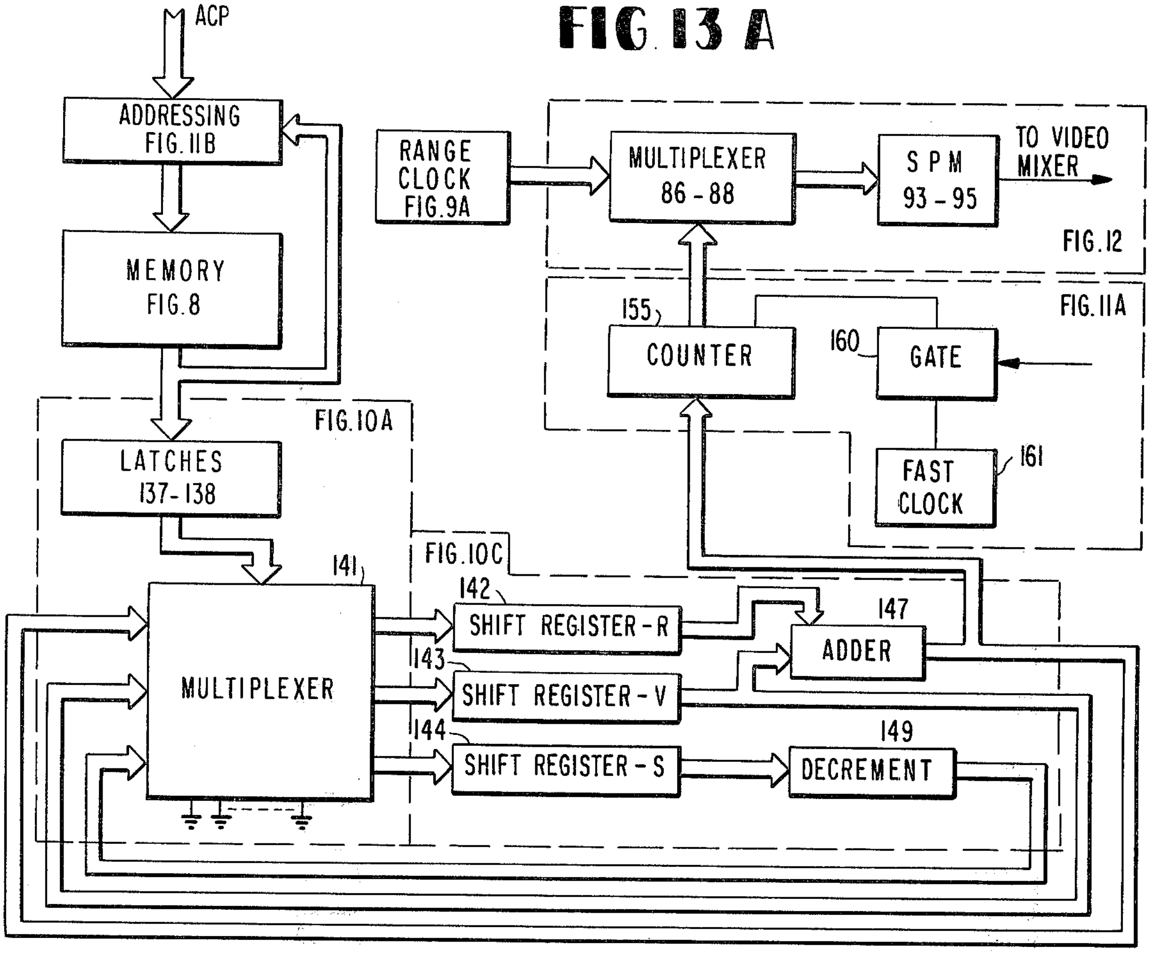
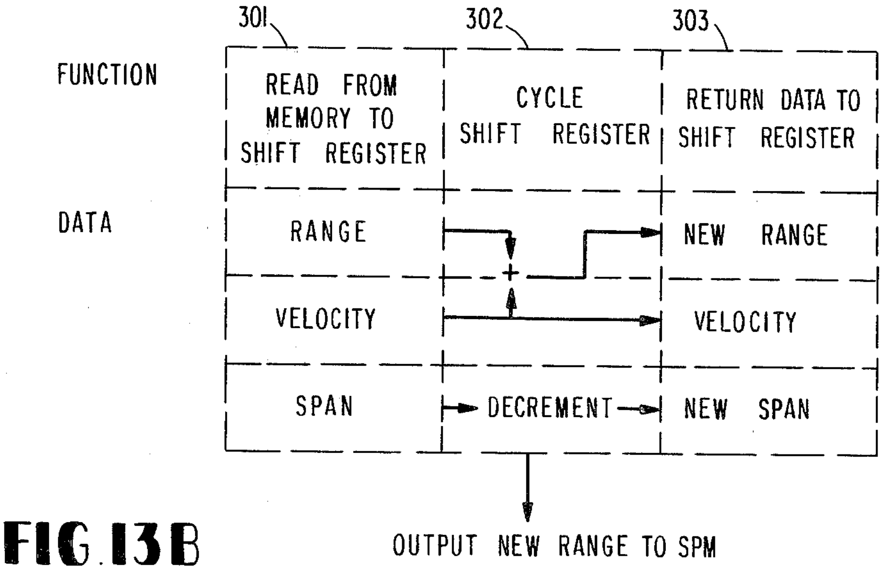
FIG 13B

DIGITAL INDICIA GENERATOR EMPLOYING COMPRESSED DATA

FIELD OF THE INVENTION

The present invention relates to display systems, and more particularly, to display systems which display signals form an environment external to the display, and which also includes graphics generating apparatus to generate indicia for the display so that the signals and indicia are concurrently created and displayed.

BACKGROUND OF THE INVENTION

Graphic displays comprise a well developed field of technology having a variety of applications. For example, displays are employed in laboratories for graphic display of output signals; a similar funtion is carried out for maintenance purposes in field locations and a final exemplary application of graphic displays is associated with the radar field. In each of these applications, it is often helpful to the display user to display, in addition to the information bearing signals, some indicia to aid in interpreting the meaning to be derived from the signals themselves. For example, in the laboratory or maintenance fields, test signals from apparatus being tested or maintained may be displayed, and it is helpful to have some indicia, i.e., a reference line or the like on the display so that, for example, the operator can readily determine whether the signals are within a predetermined tolerance of nominal levels. In a radar environment, where different aircraft may be displayed, it is helpful to have a map displayed along with signals to aid the operator in readily identifying the location of the various aircraft which are being displayed.

Prior art displays have the capability of drawing predetermined symbols on a display in association with some information-bearing signals to assist in interpreting the information of the information-bearing signals. A predetermined symbol to be drawn may be defined in terms of a number of points making up the predetermined symbol, see Tyler U.S. Pat. No. 3,605,109 and Zuckerman U.S. Pat. No. Re. 29,351. A major disadvantage with this arrangement is the large amount of storage required for storing a plurality of coordinates of points making up a predetermined symbol.

A number of systems have been disclosed which reduce memory requirements, without loss of resolution. The memory stores less display points than the number needed for minimum resolution and the apparatus generates or derives further display points by interpolation, see Quarton U.S. Pat. No. 4,038,668 and Blixt U.S. Pat No. 3,686,662. Dalena U.S. Pat. No. 3,792,304, although concerned with controlling brightness during display of an azimuth reference in a radar display, does disclose employing reference length and azimuth to generate an indicia for a radar display. However, this arrangement generates the indicia during radar dead time and does not employ the sweep used for presentation of radar data. For that reason, extra apparatus is required for the indicia generation. Furthermore, since Dalena only generates an azimuthal reference he is not concerned with the accuracy of his indicia end points and thus does not have to address registration problems which, as will be mentioned below, are significant.

Another prior art arrangement employs a "memory" arrangement for maps and the like wherein the map "memory" is actually a transparency. The map transparency is scanned by a flying spot scanner which is coordinated with the sweep action of the display on which the map is to be created. The display unblanking signal is then derived, in part, from the output of the flying spot scanner, and is in part comprised of the information-bearing signals. A major disadvantage with this approach is the misregistration which occurs if the flying spot scanner is not operated in tight synchronism with the display sweep. Temperature and aging effects serve to make more difficult maintenance of registration over the long term. In addition, creation of the transparency can be quite difficult if the display is subjected to tight tolerance requirements, i.e., the map must be accurately drawn and must be stable with temperature.

Accordingly, it is an object of the invention to provide a display system for signals generated external to the display in association with indicia generated internal to the display, which employs the same display deflection arrangement for both externally generated signals and indicia generated signals, and concurrently displays both indicia and externally generated signals. It is another object of the present invention to provide a display in which the indicia generated and displayed are coordinated with the externally generated signals, such that registration and tolerance problems are reduced. It is still a further object of the invention to provide the foregoing features with an X-Y or R—Λ sweep. Finally, it is an object of the invention to provide an indicia generator which can be used in conjunction with a radar display employing a R—Λ sweep.

SUMMARY OF THE INVENTION

These and other objects of the invention are met by providing a memory arrangement storing coordinates of a point on an indicia, i.e., a starting point, a slope of the indicia, and a length of the indicia. As each display sweep is generated, counters keep track of the location of the indicia intersection with the sweep line being generated and the counters provide an unblanking signal to display the intersection. In an embodiment specific to a raster sweep, the point coordinates are defined in X-Y coordinate terms and for displaying a single indicia the processing is performed in real time as the sweep is being generated.

In a PPI embodiment, which is capable of displaying multiple indicia, point coordinates are stored in terms of range and azimuth. By using plural shift registers the effect of multiple counters is provided and processing the display points is carried out prior to sweep generation. The processed display points are stored in a scratch pad memory to be read out concurrently with range sweep generation. A trio of scratch pad memories are provided. Each memory, in turn, has new data written therein, is read for display, and then is cleared. This latter embodiment can write display indicia at any orientation, including radial.

In either embodiment, the indicia signals and information bearing signals are displayed concurrently by mixing them in a video amplifier and, of course, the display employs but a single deflection system.

BRIEF DESCRIPTION OF THE DRAWINGS

The present invention will now be described in more detail in connection with two preferred embodiments, and in association with the attached drawings in which like reference characters identify identical apparatus and in which:

FIGS. 5 and 6 are useful in explaining the data processing techniques used in a second embodiment;

FIG. 7 (comprised of FIGS. 7A-7E) is a schematic showing of the stored data in the second embodiment;

FIG. 13A and 13B are respectively a system block diagram and system functional diagram.

DETAILED DESCRIPTION OF PREFERRED EMBODIMENTS

Figure 1:
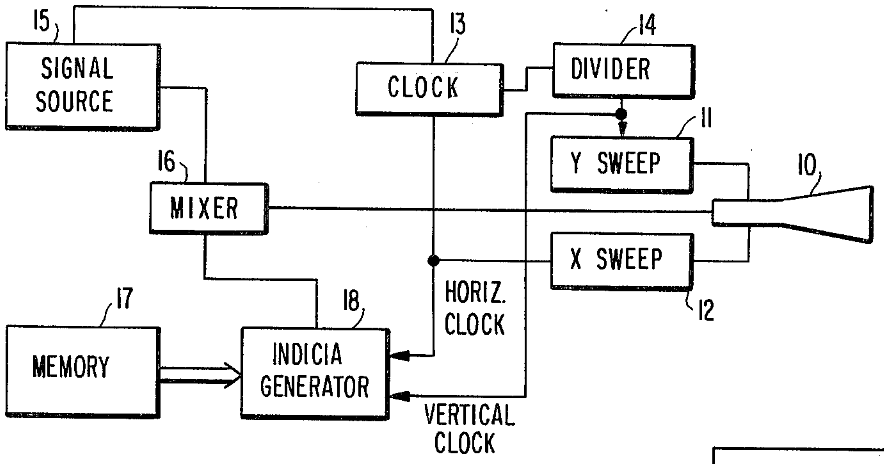
FIG. 1 is a block diagram of a first embodiment of the invention employing a raster scan display.

As shown in FIG. 1, a display, such as a CRT 10, has a raster scan deflection system including a Y SWEEP GENERATOR 11 and X SWEEP GENERATOR 12. A clock 13 drives the X SWEEP GENERATOR 12 and drives the Y SWEEP GENERATOR 11 through a divider 14. A source of externally generated signals is represented by a signal source 15. Source 15 provides information bearing signals which are to be displayed on display 10. Signal source 15 is coupled through a mixer 16 to the unblanking control for display 10, and also provides a triggering input to clock 13. The remaining apparatus shown in FIG. 1 is arranged to display an internally generated indicia, concurrent with the display of the signals from the source 15, employing the same deflection system, with minimal data storage. As shown in FIG. 1, these components include a memory arrangement 17 driving an indicia generator 18. The indicia generator 18 receives, in addition to the input provided by the memory 17, horizontal and vertical clock signals as well as horizontal and vertical sweep reset signals, (not illustrated) and provides a second input to the mixer 16 for display purposes.

Figure 2:
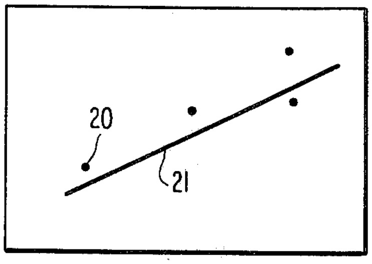
FIG. 2 is a schematic showing of a typical display.

FIG. 2 illustrates a typical display in which the information signals 15 are represented by a series of marks 20, and the indicia generator 18 is provided to generate a reference line 21.

FIG. 31 is a detailed block diagram of the indicia generator 18. The memory arrangement 17 provides four data items to the indicia generator 18 in order to generate the indicia 21. Those four data items are the coordinates of a point on the indicia 21 comprising, (1) a horizontal start coordinate $X_S$, (2) a vertical start coordinate $Y_S$ ($Y_S$, $X_S$ define, in an orthogonal coordinate system, a point on the indicia 21), (3) indicia slope, and (4) the span of the indicia (the distance from the start to the end point). Those skilled in the art will readily recognize that storage requirements for these data is significantly smaller than the storage required were the memory arrangement 17 provides coordinates of a series of points for the indicia 21.

Figure 3:
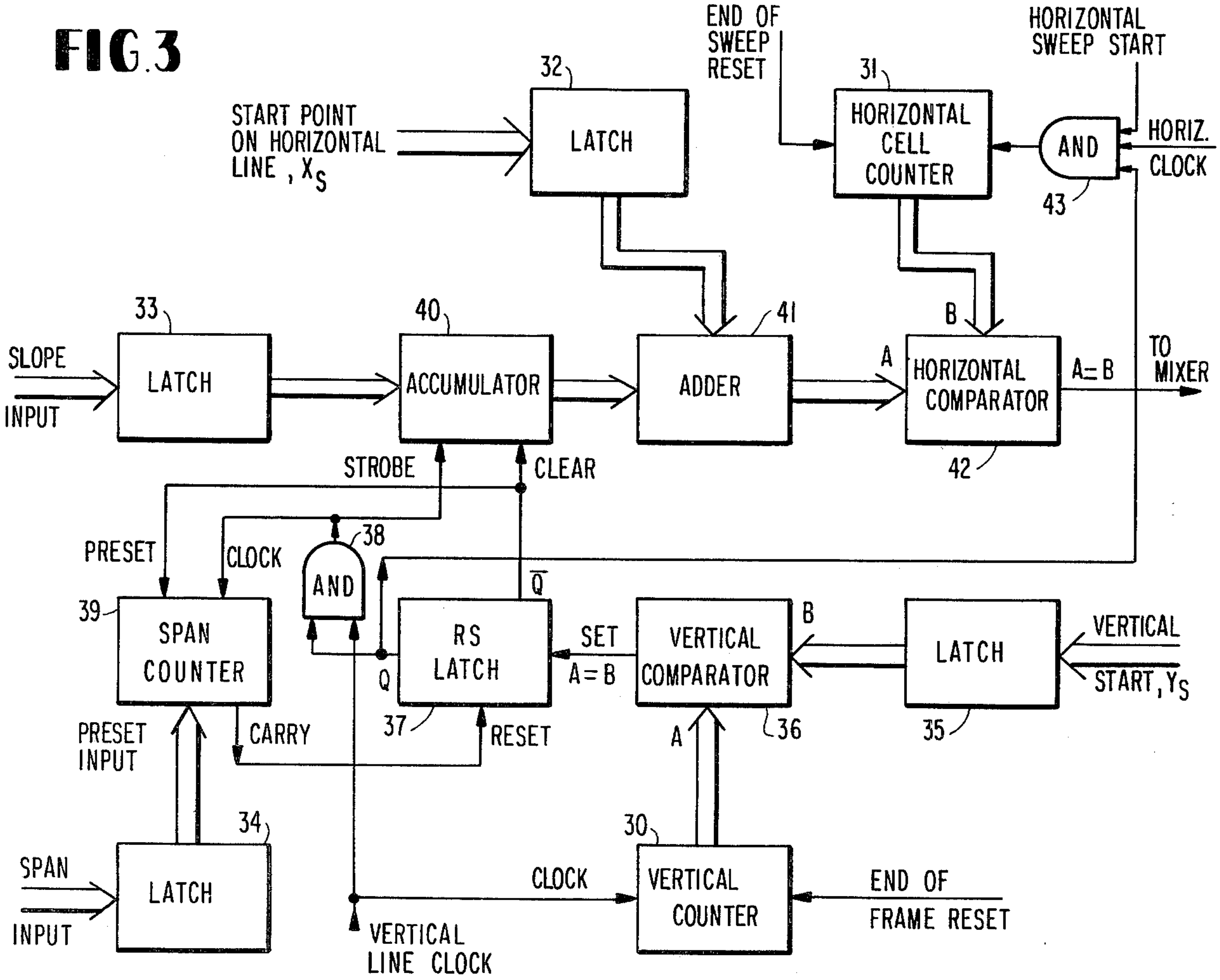
FIG. 3 is a block diagram of one embodiment of a generator.

As shown in FIG. 3, the indicia generator 18 includes a vertical counter 30 and a horizontal cell counter 31. Latches 32-35 are provided to store the quantities received from the memory arrangement 17. The output of latch 35, storing $Y_S$, is provided to a comparator 36, another input of which is the output of vertical counter 30. The output of comparator 36 is provided as a setting input to an RS latch 37. A Q output of the latch 37 is provided as one input to an AND gate 38, the other input of which is provided by the vertical clock. The output of the AND gate 38 is provided as a clocking input to a span counter 39 as well as a strobing input of an accumulator 40. The $\overline{Q}$ output of the latch 37 is provided as a clearing input to the accumulator 40 and a presetting input to the span counter 39. The count to which the span counter 39 is preset is provided by the latch 34, and a carry output of the span counter 39 is provided as a resetting input to the RS latch 37. The latch 33, receiving the slope input for indicia 21, provides an input to accumulator 40. In turn, accumulator 40 provides an input to an adder 41, the other input of which is provided by the latch 32. The output of adder 41 is provided to a horizontal comparator 42, the other input of which is provided by the horizontal cell counter 31. An AND gate 43 receives three inputs, one from the Q output of the latch 37, one from the horizontal clock, and one comprising a horizontal sweep start signal. The horizontal reset is provided as another input to the horizontal counter 31 and the vertical reset is provided as an input to the vertical counter 30.

Figure 4:
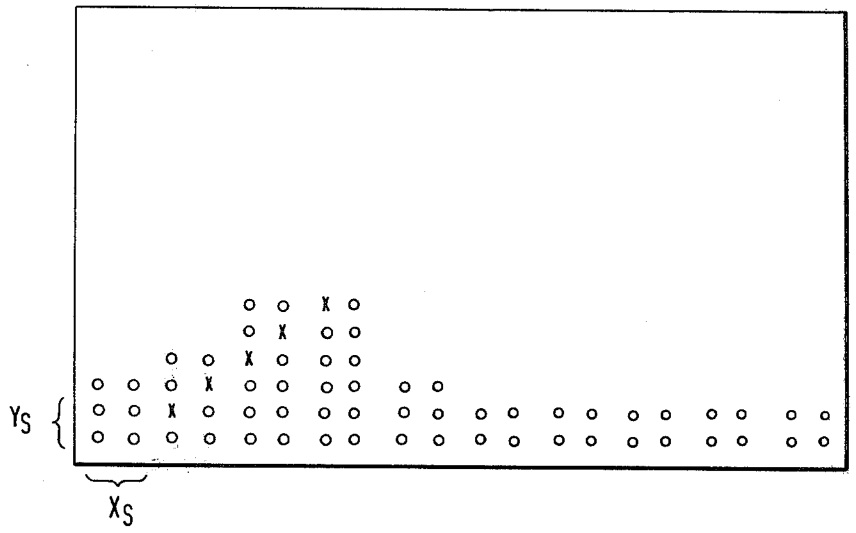
Fig. 4 is a schematic showing of display generation.

Before disclosing the operation of the indicia generator 18 in detail, reference is made to FIG. 4 to illustrate the manner in which the indicia generator operates.

FIG. 4 is a schematic representation of the display wherein each dot represents beam deflected position at an instant of time. With the raster scan of the apparatus of FIG. 1, the beam starts a frame in the lower left hand corner and moves, in a generally horizontal direction, until it reaches the end of the first horizontal line at which point it is indexed to the second horizontal line at the left and the beam sweeps in a horizontal direction, and so on. The starting point for the indicia 21 is at a location $Y_SX_S$. The vertical counter 30 counts vertical clock pulses and thus is a measure of present sweep vertical position. After a number of counts equivalent to $Y_S$, vertical comparator 36 provides an output to set the latch 37. Once the latch 37 is set, the AND gate 38 is enabled to pass vertical clock pulses, but of course, does not do so until the next vertical clock pulse. However, AND gate 43 is partially enabled by the same output. Thus, after the horizontal sweep starts, AND gate 43 outputs horizonal clock pulses. When the horizontal cell counter 31 reaches a count comparable to that which is stored in the latch 32 (coupled through adder 41 to the comparator 42) an output is provided to mixer 16 (see FIG. 1). This enables the video to be unblanked for that count and once the count exceeds the quantity in the latch 32, the video is again blanked. This operation produces the single illuminated point in the horizontal sweep of the line at a vertical distance $Y_S$ from the origin. The next vertical clock pulse strobes into the accumulator the quantity stored in the latch 33, i.e., line slope, and also clocks the span counter. Accordingly, adder 41 now provides to the horizontal comparator 42 not the quantity stored in the latch 32, but that quantity summed with a slope input. Assuming a positive slope, the adder 41 now contains a higher quantity that it previously contained. Correspondingly, if the slope were negative, the adder 41 would have a lower quantity. On the next horizontal sweep, when the horizontal cell counter 31 reaches a count equal to the output of adder 41, horizontal comparator 42 again unblanks the video through the mixer, to produce a second "spot" on the indicia 21. This operation continues, creating the indicia 21 until such time as the span counter 39 produces a carry output, indicating that indicia 21 has been completed. This resets the latch 37, preventing vertical clock pulses from clocking the span counter 39 or strobing the accumulator 40. Actually, resetting the latch 37 clears the accumulator and also prevents the AND gate 43 from producing any output. At the end of the frame, the vertical counter 30 is reset and the apparatus is again enabled to create indicia 21 on the next frame. Thus, the hardware continually compares present sweep position with indicia location and displays each point at which sweep intersects the indicia.

Those skilled in the art will understand that through the use of the mixer 16, video will be unblanked in any sweep by either the indicia generator 18 or the signal source 15 to thereby concurrently display both the information bearing signals and the indicia 21. Significantly, and because the information-bearing signals and the indicia are concurrently generated, the same deflection system is employed for the display and no special deflection arrangement is required.

The foregoing apparatus is sufficient to create any straight line indicia. For curved lines, the slope input, i.e., the quantity stored in latch 33, must be changed in the course of indicia generation. This is implemented by storing several slopes, for example, as a function of vertical line count, and providing another comparator 36' having an input from the vertical counter 30, and a further input from a further latch storing the vertical count breakpoint of the slope. When comparator 36' produces an output, it addresses the next memory location to change the quantity stored in the latch 33. A simpler arrangement is to store "acceleration" and use it to adjust the stored slope.

For an indicia parallel to the horizontal sweep, i.e., span=1, a further counter is provided, enabled by the output of comparator 42 arranged to count pulses provided by gate 43 until a preset count is reached. The preset count is loaded when a span=1 indicia is detected and the count loaded determines the length of the indicia.

The preceding apparatus will draw a single indicia, or multiple indicia which do not overlap. Drawing overlapping multiple indicia may be effected by time sharing gates and counters. An example is provided in the following portions of the specification in connection with an $R-\theta$ swept display.

In the radar case, the deflection system does not operate in Cartesian coordinates, but rather operates in polar coordinates. The vertical line clock is replaced by an antenna azimuth clock counting, for example, 4096 pulses per revolution. The horizontal start point $X_s$ is replaced by $R_s$ (the start range), the vertical start point $Y_s$ is replaced by a start azimuth.

In polar coordinates, a straight line has the form $$P=b/(\text{sine }\theta-m\text{ cosine }\theta),$$

where P=range, $\theta$=azimuth, and b and m are constants. In Cartesian coordinates, the slope is given by the first derivative, however, in polar coordinates, all derivatives have value. For simplicity, only the first derivative is employed and this has the form $$dp/d\theta=-b(\text{cosine }\theta+m\text{ sine }\theta)/(\text{sine }\theta-m\text{ cosine }\theta)^2$$

Employment of only the first derivative as a measure of slope leads to errors in line generation, but this can be accommodated by breaking the line into segments and using new parameters for each segment. Each line segment is made as long as possible within some error criterion. When the error limit is reached, a new segment is started.

Figure 5:
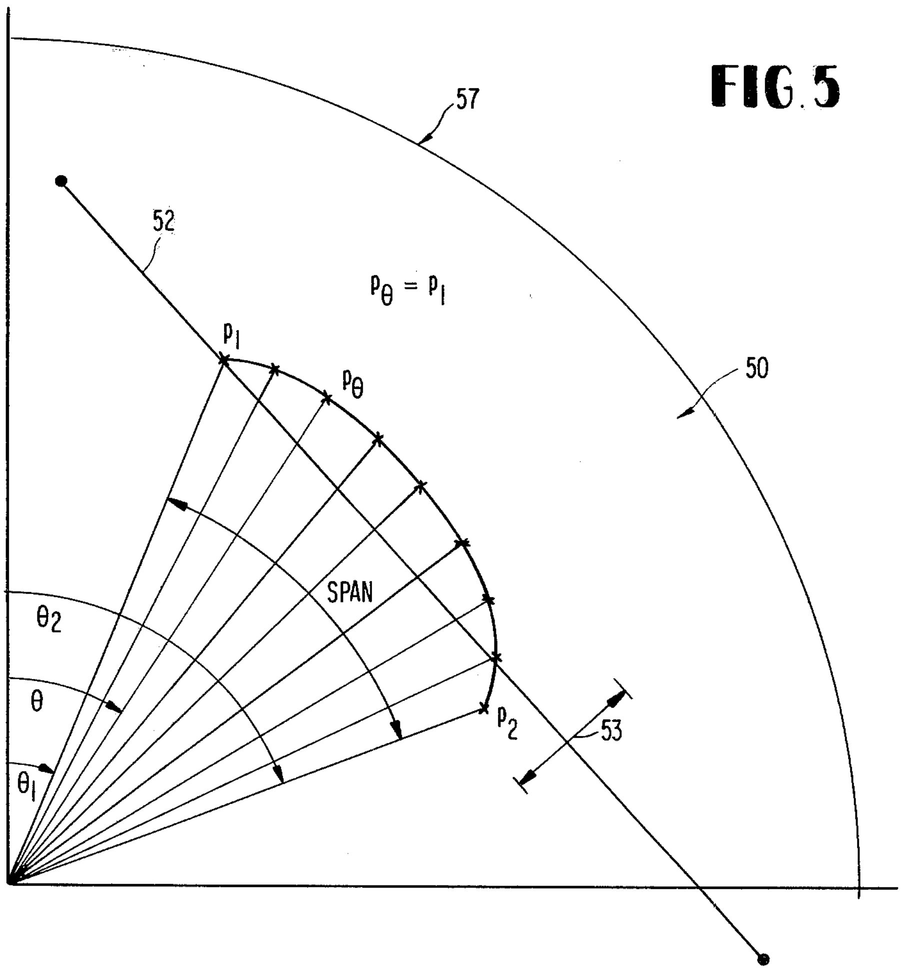

For example, FIG. 5 illustrates one quadrant 50 of a typical PPI display. If we assume that we wish to generate the indicia 52 between azimuths $\theta 1$ and $\theta 2$ with tolerance indicated by the reference character 53, we can employ an approximation to that indicia by a chord from P1 to P2. This type of approximation saves memory space needed to generate the indicia. With such an approximation all indicia points $P_\theta$ existing between the point $P1_{\theta 1}$ and $P2_{\theta 2}$ are displayed. Assuming, as is typical, that range is divided into 1024 range slots per azimuth, then range information requires 10 bits, and all the points on the indicia can be displayed with one 16 bit word, 10 bits for range and 6 bits to indicate the span, i.e., $\theta 2-\theta 1$. Further segments of the indicia 52 are displayed using the same techniques, but different values of P and $\theta$.

The technique described above, known as zero order approximation, can be improved by computing $P_\theta$ as equal to some initial value plus a correction along the span of the indicia. The equation is $$P_\theta=P_{\theta 1}+[dp/d\theta]\,(\Delta\theta)\text{ where }\theta_1<\theta<\theta_2.$$

This first order approximation is illustrated in FIG. 6. As shown there, the range at any azimuth is altered or corrected from initial range based on the indicia slope as approximated by the first derivative. This technique requires storing, for each indicia segment, start azimuth and range, "slope" (i.e., $dp/d\theta$, hereinafter termed velocity) and length or span. Based on computer simulations, we estimate that displaying indicia which are defined in memory in a form employing the first order approximation technique of FIG. 6 enables data compression on the order of 20 to 1 as compared to merely storing sufficient data points to create the desired indicia.

The savings in equipment brought about by the use of this data compression technique is not, however, without disadvantage. With data points merely stored in a memory, the memory can be directly interrogated to control the unblanking control of the display. Employing compressed data, however, requires some processing of the data before it can properly control the unblanking of the display to create the desired indicia. The computation to be performed by the hardware is, however, relatively simple. The computation performs the algorithm:

$$P_i=P_0+V_i\Delta\theta\text{ where }1<i<n$$

$P_i$=current value of range
$P_0$=initial value of range
$\Delta\theta$=one azimuth cell
n=total number is azimuth cells for which this value of V is valid, i.e., span length
i=number of azimuth cells from start of segment
V=velocity=$dp/d\theta$ The computation actually proceeds by adding velocity to current range once for each azimuth cell, i.e., by proper scaling $\Delta\theta$ is chosen to equal 1.

Typically, for straight lines, the velocity will vary between the azimuths for which the parameters are to be effective. To minimize data storage it is desirable to approximate velocity by a constant over the range. To do this, we prefer to determine velocity at the mid point of the range.

As a result of the data compression techniques employed, the memory only stores a record comprising two words for each indicia segment to be displayed, and since the indicia segment may be valid, in general, for several azimuth sweeps, the memory does not necessarily store data for each azimuth sweep.

Since the processing and display are carried out concurrently the apparatus must be arranged to process the parameters corresponding to an indicia segment data before it is to be displayed.

The set of counters of the first embodiment were sufficient to create an indicia, i.e., a single line. In general, to display overlapping multiple indicia a multiple set of counters is required; each set is required for keeping track of where an indicia and sweep intersect. The second embodiment, to be described below, employs plural shift registers, with corresponding stages of the registers functioning as the counters of FIG. 3. The plural stages of the plural registers thus function as plural counters. Of course, those skilled in the art will appreciate that the shift register is but an example of apparatus that can be employed and equivalent apparatus, such as plural registers with an associated addressing arrangement, can be used as well.

Before describing a detailed diagram of the apparatus, a specific memory arrangement and data storage will be briefly referred to. This is merely exemplary as those skilled in the art will readily be able to make changes once having read this description. FIGS. 7A through 7E illustrate five different word formats contained in the device memory. As illustrated in these Figures, each word is a 16 bit word. Based upon the preceding discussion, a word or group of words is stored for each indicia segment and, of course, the number of segments is determined by the error criterion. Generally, the format of FIGS. 7A through 7C is employed, however, for radially directed indicia segments the format of FIGS. 7D and 7E is used.

As illustrated in FIG. 7A, a first word of each record comprises, in bits 3 through 14, an azimuth header which is the start azimuth for the indicia segment. As shown in FIG. 7B, the second word in this format includes the start range of the indicia segment in bits 6 through 15. The third word, shown in FIG. 7C, includes velocity in bits 9 through 15, with bit 15 corresponding to the sign, and span or segment length data in bits 3 through 8. Velocity is the term used to represent the approximation to indicia slope given by the first derivative.

For each of the words, bit 0 is a parity bit and bits 1 and 2 tag the associated word for identification. Thus, a bit pattern 0, 1 is an azimuth tag, whereas the bit pattern 0, 0 is a range tag and the bit pattern 1, 0 tags a word including velocity and span. These three words are sufficient to define an indicia segment so long as the indicia segment is not a radial line.

If the indicia segment is a radial line, then in addition to the azimuth word of FIG. 7A, the words shown in FIGS. 7D and 7E are employed. The tag ID bits 1, 1 indicates a radial value for the number of azimuth change pulses contained in the span field and of a length, for each of the azimuth change pulses, equal to the value in the length word comprising bits 9–14. Words relating to multiple indicia may be stored between a pair of azimuth headers. Although each pair of records relate to different indicia each would relate to an indicia which begins at the azimuth of the preceding azimuth header.

Figure 8:
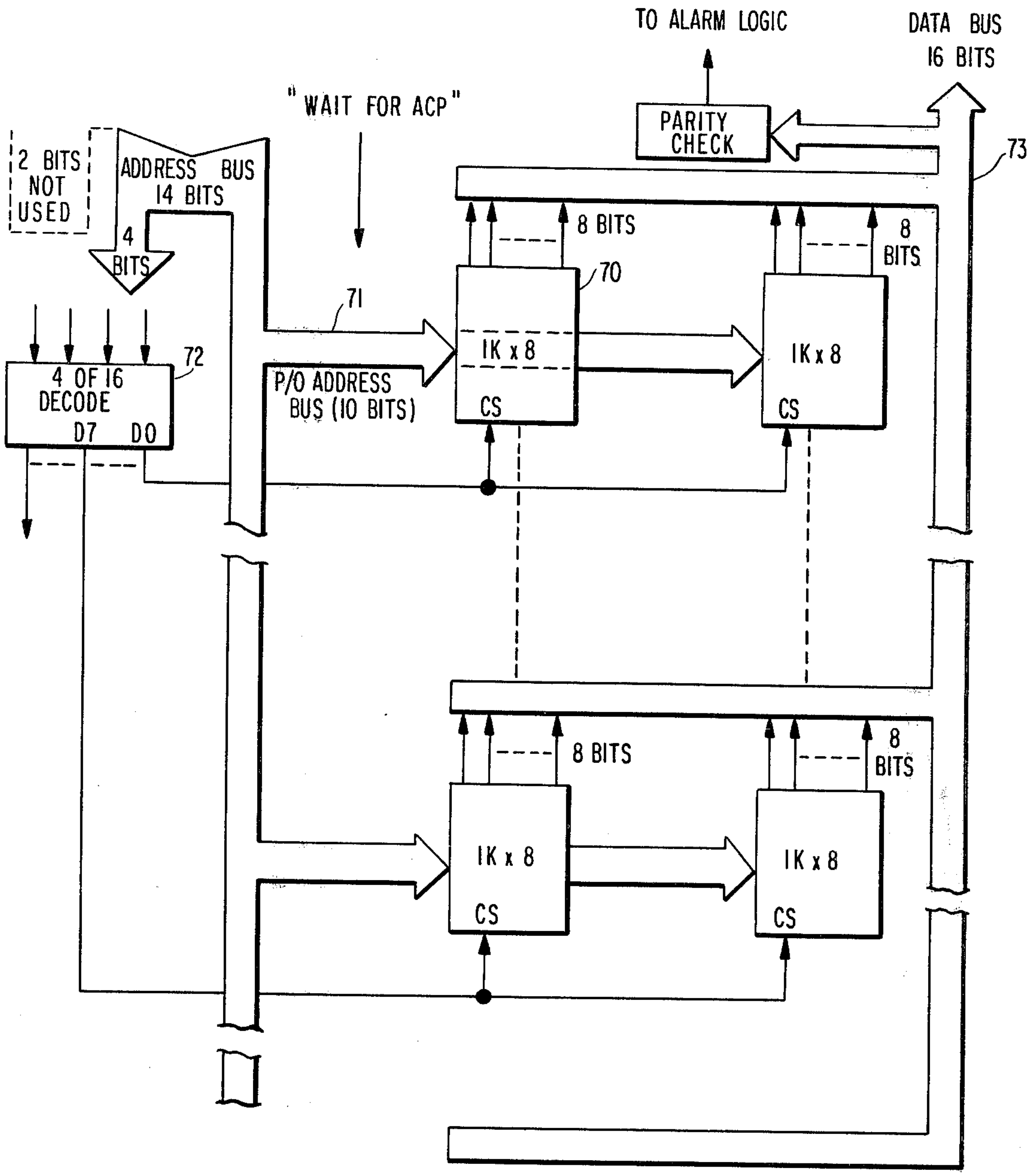
FIGS. 8, 9A, 9B, 10A, 10B, 10C, 11A, 11B and 12 are block diagrams of the second embodiment illustrating, respectively, the memory arrangement, range clock source, azimuth count source, data readout from memory, data processing, a detail of FIG. 10A, memory address generation, further processing, and scratch ped memory apparatus.

FIG. 8 illustrates one embodiment of a memory arrangement. The only essential requirement is sufficient storage for the data required in a format making the data easily retrievable. Sixteen memory modules, each including two memory packages 70 are addressed by 10 address bits of a 14 bit wide address bus 71. The other four bits are decoded in a decoder 72, and the outputs are employed to select the effective memory module. As illustrated in the drawing, each memory is word organized, including 1K 8 bit words. Inasmuch as two memory packages are effective simultaneously, their outputs provide a 16 bit output for data bus 73. While the memory can be either RAM or ROM, the latter is preferred in that it allows different indicia or "maps" to be employed by simply unplugging one memory and replacing it by another.

Before discussing FIGS. 9–12, comprising a detailed block diagram of the second embodiment, several differences between the two embodiments, over and above the differences between the raster sweep of the first embodiment and the PPI display of the second embodiment will be explored. The apparatus shown in FIG. 3 is sufficient to provide for a single indicia, such as the indicia 21 shown in FIG. 2. In order to create other indicia, the data corresponding thereto must be retrieved from memory 17 and properly inserted into the respective latches of FIG. 3. In contrast, the second embodiment is capable of displaying multiple indicia, for example, in a map format. As is typical with a map there may be many indicia crossing a single radial. Inasmuch as the data stored in memory 17 is compressed and requires some processing of the data before it is suitable for display purposes, it is apparent that it is not possible to merely read out the appropriate data from the memory, process it and display it in real time as the display is being created. Rather, three scratch pad memories are provided, and during any instant of time, one of the scratch pad memories holds data from a previous display sweep which is being cleared, a second scratch pad memory contains data for controlling the sweep then being generated, and a third scratch pad memory is being loaded with data for the next display sweep. The data being loaded is, of course, data which has been read out of the memory and processed.

FIG. 13A is a block diagram showing the major components and their interconnections as well as referring to other FIGS. 9–12 for more detailed illustrations while FIG. 13B shows, in functional fashion, the operations performed on typical data. Consider a typical record (relating to a single indicia segment) consisting of a range word, a velocity word and a span word. As shown in FIGS. 7A–7E, these are stored in memory as two words, but as will be disclosed, after memory readout, the data is unpacked. In memory each record must be associated with an azimuth header, but plural records may be associated with a single azimuth header if plural indicia segments start at a common azimuth (within the system resolution). As shown in FIG. 13B when the record is read from memory (function 301) data is inserted into one of three shift registers 142–144 (see FIG. 13A). The shift registers are cycled once per change in azimuth (function 302), and during cycling the range word is arithmetically modified by the velocity word to produce a new range word. At function 303, the new range word and original velocity words are returned to their respective shift registers. Simultaneous with the range word modification the span word is decremented, and the modified span word is re-written into the shift register at function 303. The modified range word is fed, during function 302, to the scratch pad memories where it is written for later read out. During one cycling of the shift registers, one scratch pad memory is available for readout to control the display, another scratch pad memory is written with the data from the shift registers so as to control the succeeding display sweeps. After our typical record has cycled through the shift registers a number of times equal to the original span word it is deleted and new data may be read in, if available. Otherwise, the shift register stage is cleared.

Referring now to FIG. 13A, the memory (previously discussed) is controlled by the addressing circuits (to be discussed with respect to FIG. 11B) which are driven by the ACP bus. Data read from memory is initially stored in one of latches 137–138; after re-formatting the data is stored in one of the shift registers 142–144 by multiplexer 141. In each cycle of the shift registers and for each step of the cycle, adder 147 adds a range and velocity word. The adder 147 provides an output to multiplexer 141, for re-insertion to shift register 142, and to counter 155. The shift register 143 provides an output to adder 147, as well as to multiplexer 141. Finally, the shift register 144 has its output decremented in counter 149, which provides the decremented output to the multiplexer 141.

The counter 155 normally provides an output to multiplexers 86–88 for writing into one of the SPM (scratch pad memories) 93–95. The output is normally the same as the input. The SPM stores a bit at the location or address defined by the counter output. Each SPM "maps" a single range sweep and the stored bit corresponds to an illuminated "point".

To display indicia which are radially directed, the foregoing operation is modified as follows. The velocity word is replaced by a length word, specifying the length of the indicia beginning at the point specified in the range word. The memory ID bits specify either radial or non-radial modes. In the radial mode, the start range is added to the radial length by adder 147 and the resultant is re-inserted into the shift register if the span count is not decremented to zero. The resultant is also provided to counter 155. Instead of supplying this single word (corresponding to that address) to the SPM, however, in the radial mode, the counter is cycled for a number of counts equal to the radial length by a fast clock 161. Thus, the counter 155 supplies a plurality of words (corresponding to a plurality of addresses) to the SPM between start range and the end of the radial indicia to set a bit in the SPM for each such word (or address). While one SPM is being written into at addresses specified by the output of the counter 155, the other two SPMs are cycled by the range clock. One of these two has all bit positions cleared, preparatory to writing, while the other is read to the video mixer which mixes map data from the SPM with radar video to create the desired display.

Figure 11A:
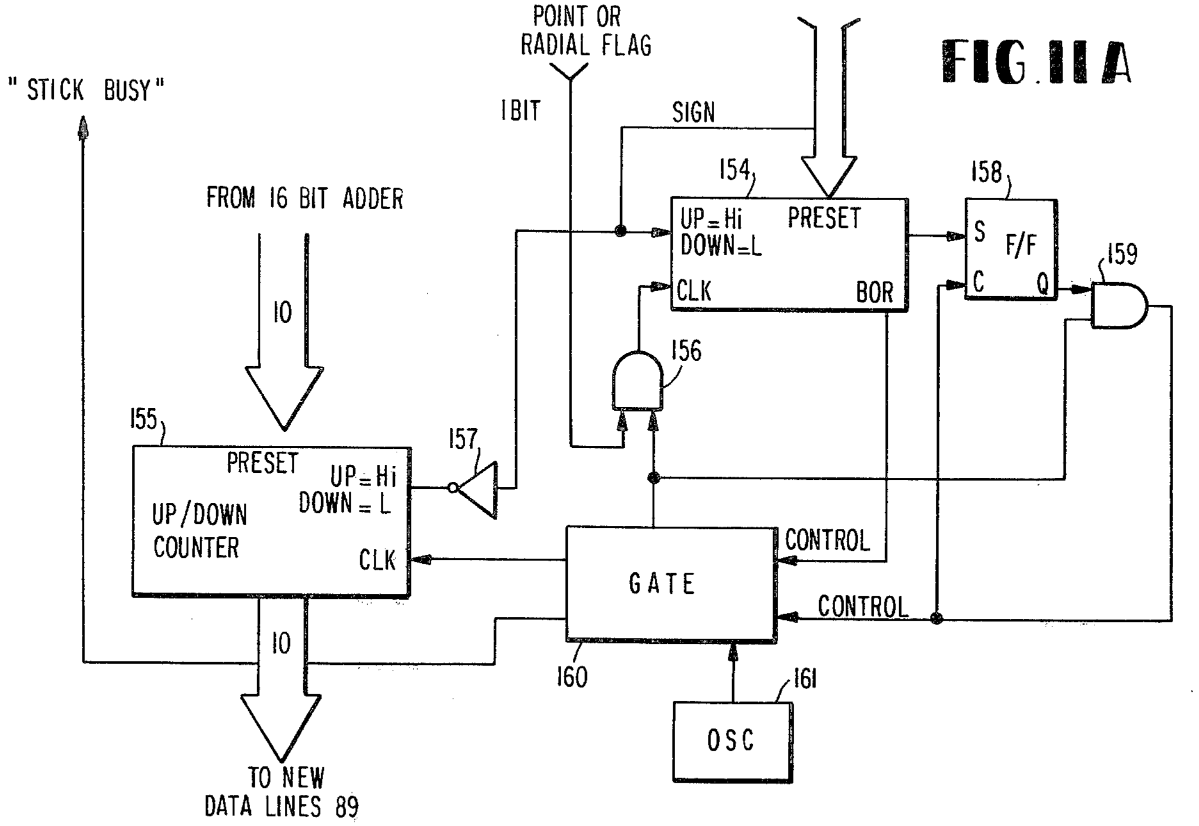
Figure 11B:
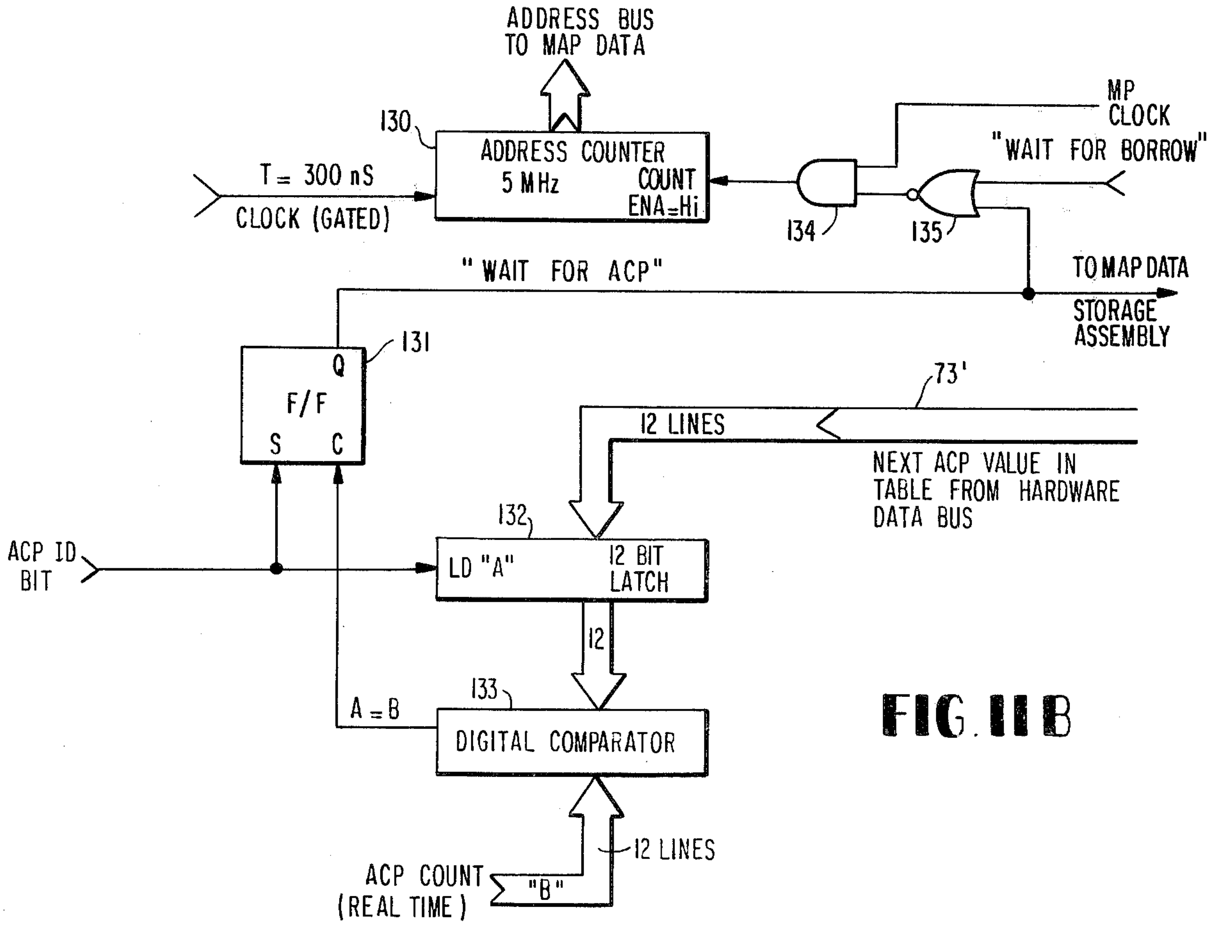
Figure 12:
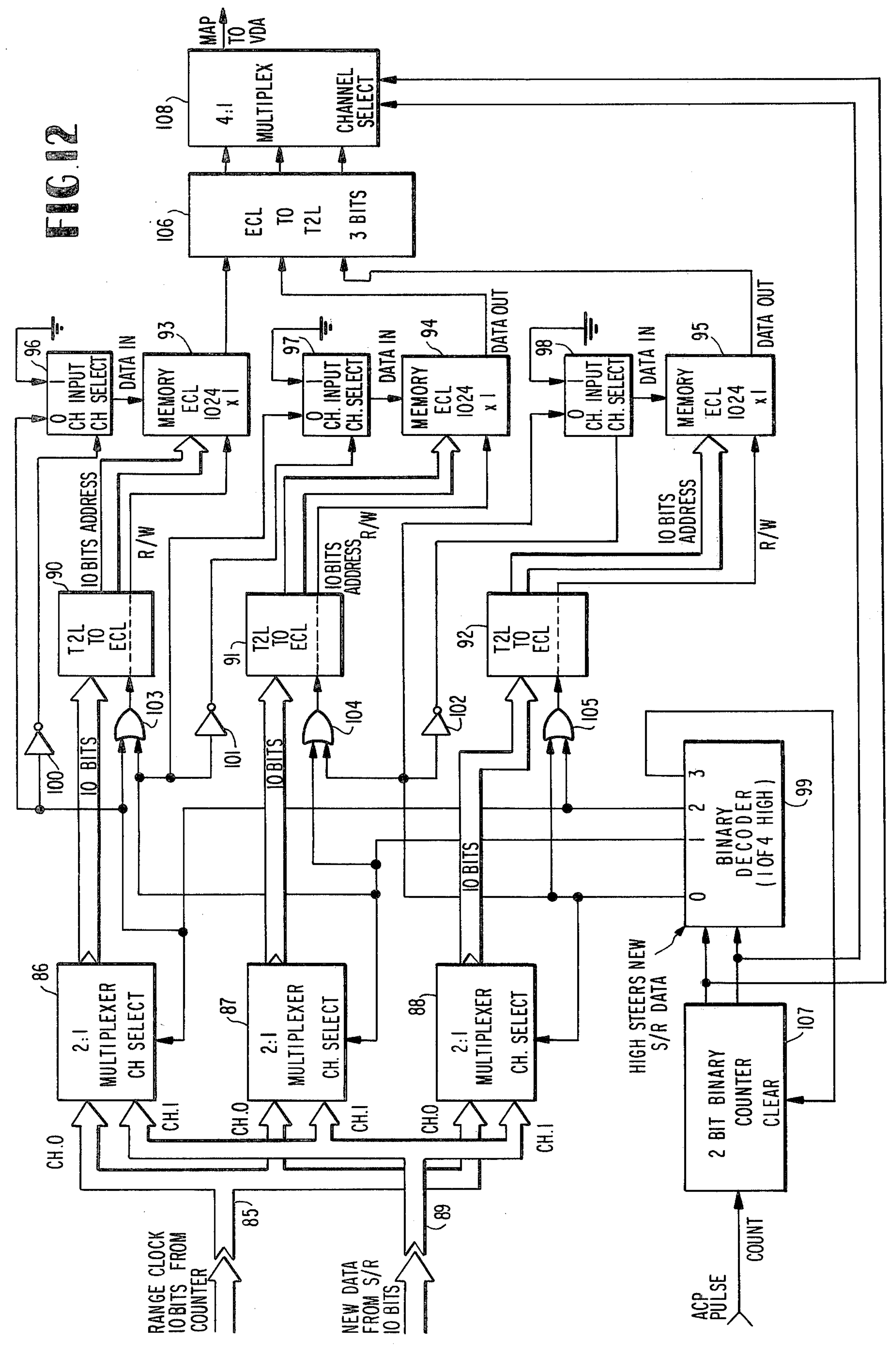

To see how the foregoing functions are accomplished we refer to FIGS. 9–12. FIG. 12 is a block diagram illustrating the three scratch pad memories and associated apparatus.

As shown in FIG. 12, a first bus 85, 10 bits wide, carries range clock data from the range counter (disclosed hereinafter) and is applied as one input to multiplexers 86, 87 and 88. A second bus 89 carries new data, i.e., processed range data. The format of this data and the manner in which it is created will be discussed below. Bus 89 is 10 bits wide and is also coupled as an input to each of the multiplexers 86–88. To enable rapid readout, each of the scratch pad memories is preferably implemented in emitter coupled logic, whereas the majority of the remaining apparatus is TTL logic (sometimes referred to as T2L), or equivalent, and thus an output from each of the multiplexers 86–88, 10 bits wide, is coupled to one of interfaces 90–92. The output of each interface 90–92 now in ECL, 10 bits wide, is coupled as an addressing input to an associated one of ECL random access (scratch pad) memories 93–95. Each of the memories includes 1024 bits, addressed by the input from the associated interface.

Each bit in the scratch pad memory represents a point on a single radial sweep, and to display an intersection between an indicia and a radial sweep the proper bit must be set, i.e., the bit corresponding to the range of the indicia point being displayed. The data input to the scratch pad memory comes through an associated multiplexer including multiplexer 96–98. Each multiplexer has one input which is grounded, and another input which is provided from a decoder 99. Which input is effective is selected by a channel select signal which is also provided from the decoder 99 through an associated inverter 100–102. Finally, the scratch pad memory has another input which controls whether it reads data out or writes data in. The latter input is coupled through the interfaces 90–92. The corresponding input to the interface is, as is illustrated in FIG. 12, provided by one of the associated OR gates 103–105. Each of these, in turn, receives an input from the decoder 99. At any instant of time, two of the scratch pad memories are stepped through the various stages as a result of the range clock, input bus 85 being coupled through the associated multiplexer to address the memory. One of the two memories so addressed is reading data out to the interface 106, while the other is having each of its states cleared to zero for later writing of new data. The third scratch pad memory is being addressed, through its associated multiplexer and interface from the bus 89 coupling new data thereto. This scratch pad memory writes a distinctive signal in each addressed position which represents the intersection of an indicia and a sweep. The writing of the data is provided through the associated switch. The entire operation is controlled by the decoder in combination with a two bit counter 107. The counter 107 counts ACP (azimuth change pulse) and thus changes state for each different azimuth pulse. Decoder 99 responds to the output patterns of counter 107 and decodes them into one of three possible states, the fourth state causes the counter to be cleared and thus only three stable states are available from the decoder as a result of the changing bit pattern of the counter 107. Assume, for example, that the binary decoder output labelled "0" is high, and the other two outputs are low. This high output, coupled to the channel select input of the multiplexer 88, couples bus 89 to the interface 92 and thence to the scratch pad memory 95. At the same time, the high output is coupled to the channel 0 input of the switch 98 and is inverted by inverter 102 to cause the switch 98 to select its channel 0 input. Thus, the switch 98 provides a high input to the data input terminal of the memory 95. Accordingly, each stage of the memory addressed in this condition will receive and store a distinctive signal to control the display at a later time to illuminate the associated range. Accordingly, so long as the data supplied on bus 89 identifies each position on the sweep which corresponds to the intersection of an indicia and the sweep, a corresponding position in the memory will store the signal which will serve to illuminate that position on the display when the memory is read out in a later phase of operation.

The other two outputs of the decoder 99 are low and thus, multiplexers 86 and 87 couple their channel 0 inputs to their respective interfaces 90 and 91. Channel 0, of course, couples the range clock on bus 85 and thus scratch pad memories 93 and 94 are simultaneously stepped through each of their stages. The result at each memory is, however, different.

With the decoder output 0 high, and 1 and 2 low, the output of OR gate 103 is low, selecting a reading operation. Accordingly, as the memory 93 is stepped through its various stages by the range clock, the data stored therein is read out and provided to the interface 106.

On the other hand, the output of gate 104 is high, selecting a writing operation. At the same time, the output of inverter 101 is high (since its input is low) thus causing the switch 97 to select its channel 1 input, which is grounded. Accordingly, as the memory 94 is addressed by the range clock, a zero is written into each of the memory cells.

The next ACP pulse will, of course, change the high output of the decoder 99 and this will result in changing the operations performed by the scratch pad memories 93–95. Each memory performs the same operations, in turn, with respective operations being phase displaced. Accordingly, in turn, each memory has new data written therein, the next phase of operation the data is read out to the interface 106, and finally, in the last phase of operation, the memory is cleared in preparation for the writing of new data.

The output of the interface 106 is provided to a multiplexer 108. The state of the counter 107 controls the channel select to this multiplexer and the output, labelled MAP is provided to the video amplifier where it is mixed with externally generated signals, for example, the video portion of a return radar signal.

Those skilled in the art will readily understand that inasmuch as the scratch pad memory being read is read out in time synchronism with the range clock, the data stored in the memory will be displayed in a manner which is coordinated with the signal from the external environment, and thus, the indicia on the display created by the apparatus is also coordinated with the signals from the external environment.

It should also be apparent that the interfaces 90–92 are not essential to the invention and may be deleted depending on timing considerations along with proper selection of the scratch pad memory implementation.

Before explaining how the input is provided as shown in FIG. 12, the timing operations will be explained. This apparatus is illustrated in FIG. 9A and 9B.

Figure 9A:
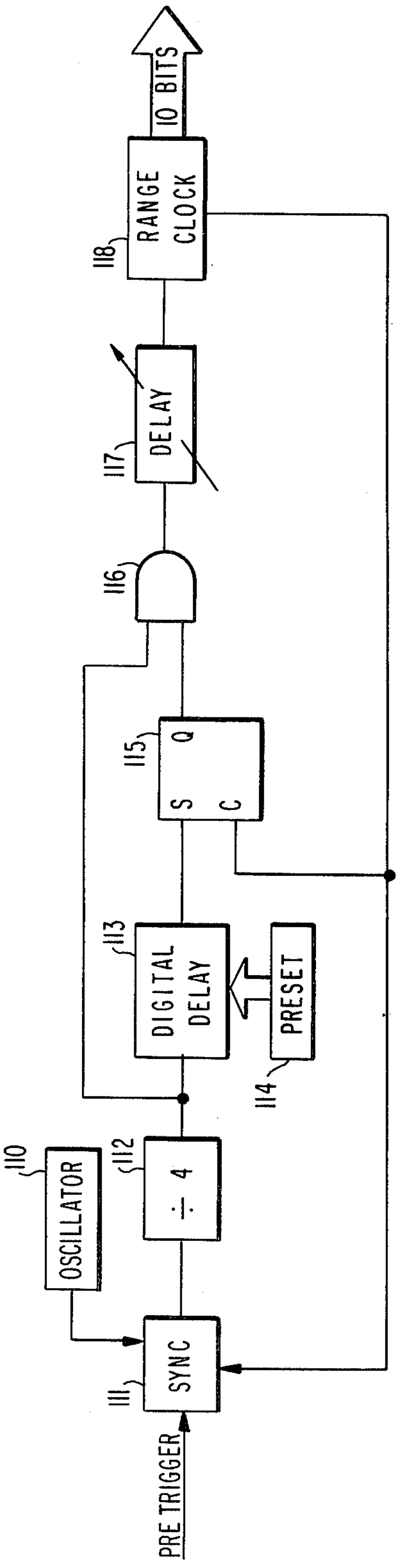
Figure 9B:
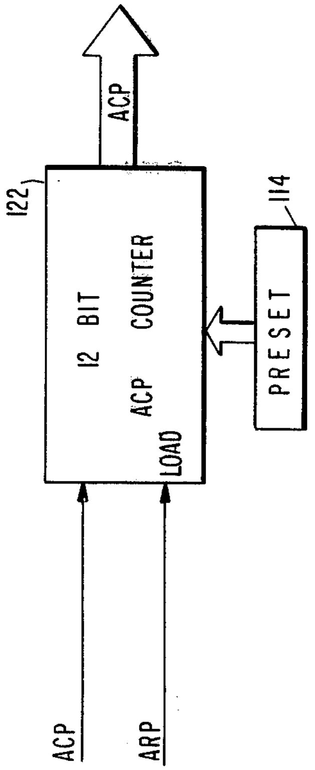

FIG. 9A shows the clocking arrangement. As shown there, an oscillator 110 is synchronized with the radar pretrigger by synchronizer 111 which drives a divider 112. The output of divider 112 is provided to a digital delay arrangement 113 which may be preset from register 114. The output of the delay 113 is provided to a flip-flop 115 to set the same. The Q output of flip-flop 115 provides one input to an AND gate 116 whose other input is provided by the output of the delay divider 112. The output of the gate 116 is provided as an input to a fine tuning variable delay 117, the output of which drives the range clock 118. Range clock 118 may be, for example, a multi-bit counter. The carry out of the counter is provided to the clocking input of the flip-flop 115 and also to reset the synchronizer 111.

The frequency of the range clock and thus the oscillator 110, is related to desired range display. For example, for a 3 nm full scale range the range clock can operate at 27.6 MHz and the oscillator 110 at four times that rate. The digital delay 113 is provided to compensate for the time difference between production of the radar RF pulse and the beginning of the display sweep. The range clock can be, for example, a 10 bit counter resulting in 1024 range cells. After the digital delay times out, the flip-flop 115 becomes set allowing the pulses from divider 112 to be passed through the gate 116 to operate the range clock 118.

As is conventional in radar equipment, the apparatus associated with the antenna provides ACP and ARP pulses to assist in interpreting the return signals. Thus, the azimuth swept out by the antenna is divided into equal increments and an azimuth change pulse (ACP) is provided every time the antenna moves from one azimuth increment to the next. In addition, once for every complete antenna revolution, the apparatus provides an azimuth reference pulse (ARP). In one embodiment of the invention, there are 4096 ACPs per ARP, i.e., the antenna sweep is divided into 4096 azimuth increments.

As shown in FIG. 9B a 12 bit ACP counter 122 is clocked by each ACP. The ARP provides a load pulse for the counter to thereby load a preset count into it from a resetting register 114. The ACP counter drives an ACP BUS which provides the digital ACP count where needed in the remaining portions of the apparatus.

The preset count in register 114 can be used as an azimuth adjustment to rotate the "map" generated by the apparatus to align it with a desired reference. The "map" can be rotated any selected amount by changing the count stored in register 114.

FIG. 11B illustrates the apparatus provided for addressing the memory. The hardware memory arrangement is shown in FIG. 8 and the data format is shown in FIGS. 7A–7E.

For addressing the memory an address counter 130 is provided which is clocked at an appropriate rate. Inasmuch as the memory is not referred to at a constant rate, that is, it is not read out continuously, but must be coordinated with the sweep, the apparatus associated with the counter 130 in FIG. 11B, gates the counter on and off at appropriate times. More particularly, the output of ACP counter (FIG. 9B) is coupled to a digital comparator 133. Thus, digital comparator 133 has available the real time antenna azimuth. A latch 132 is coupled to 12 output lines from the memory (FIG. 8) carrying the azimuth value; the identifying ACP ID bit is coupled to the load input. Presence of the proper ID bit allows the latch 132 to load only the azimuth word. The same output is coupled to the setting input of flip-flop 131. Thus, when the memory has read an azimuth value, it is loaded into the latch 132 and available to the comparator 133. Assuming the azimuth values are not equal, i.e., the azimuth read out of the memory does not correspond to the actual antenna azimuth the flip-flop 131 remains set providing a WAIT FOR ACP signal to a NOR gate 135. The other input to NOR gate 135 is WAIT FOR BORROW. When both of these signals are low, the NOR gate 135 produces a high input to AND gate 134, which is clocked from a multiphase clock and thus periodically enables the address counter. The address counter causes the memory to read out in turn several new words until the next azimuth value is read out. This sets flip-flop 131 producing a high input to NOR gate 135 terminating the counter enablement signal. Typically, the last word read out of memory is the azimuth header associated with the next group of records (not yet read). This produces the WAIT FOR ACP and inhibits further readout. When the WAIT FOR ACP goes low (assuming WAIT FOR BORROW is also low) new records are read, the reading terminating with the next azimuth value. To see how the apparatus operates with the new data just read out of the memory, reference is now made to FIGS. 10A and 10B.

Figure 10A:
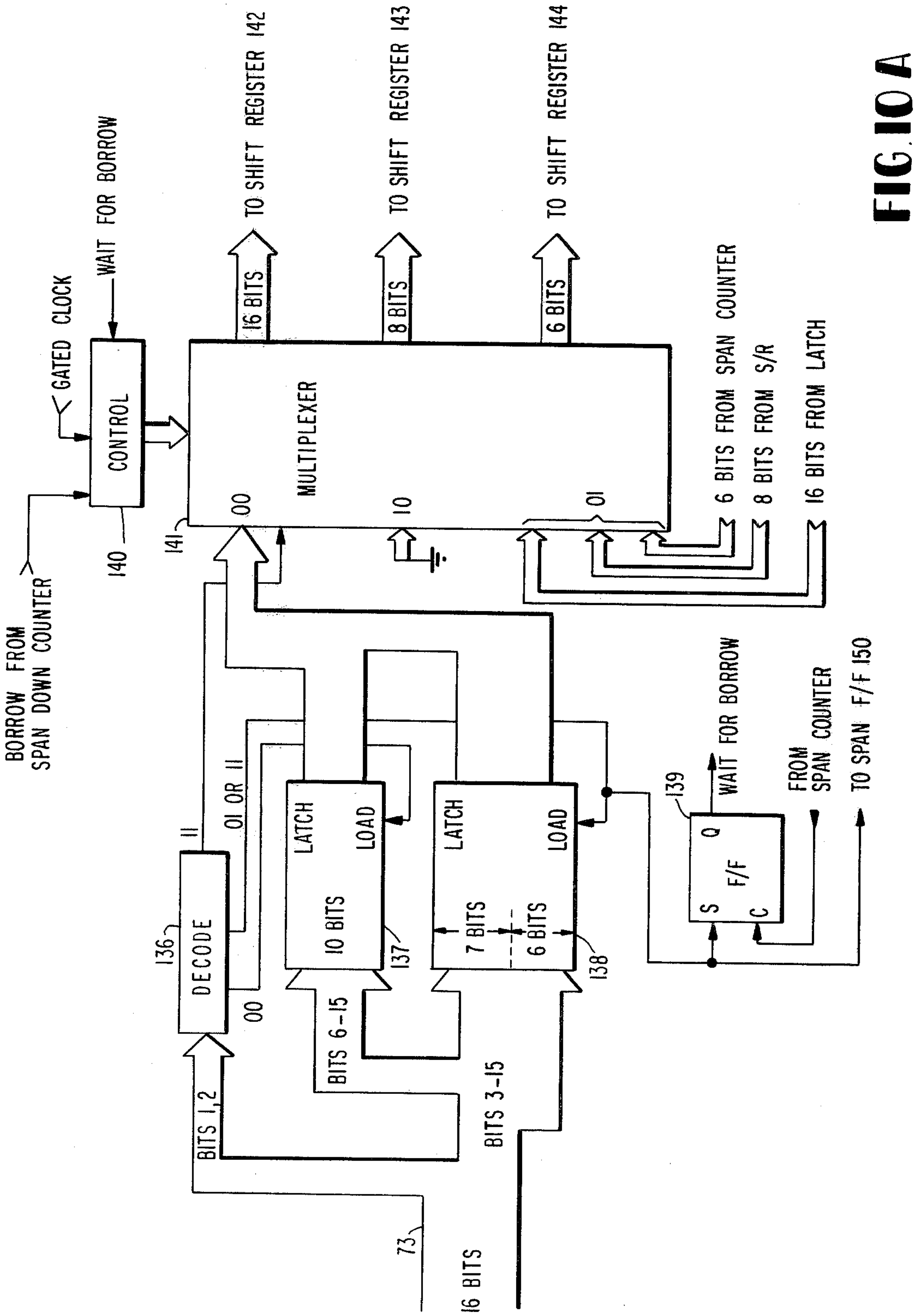
Figures 10B, 10C:
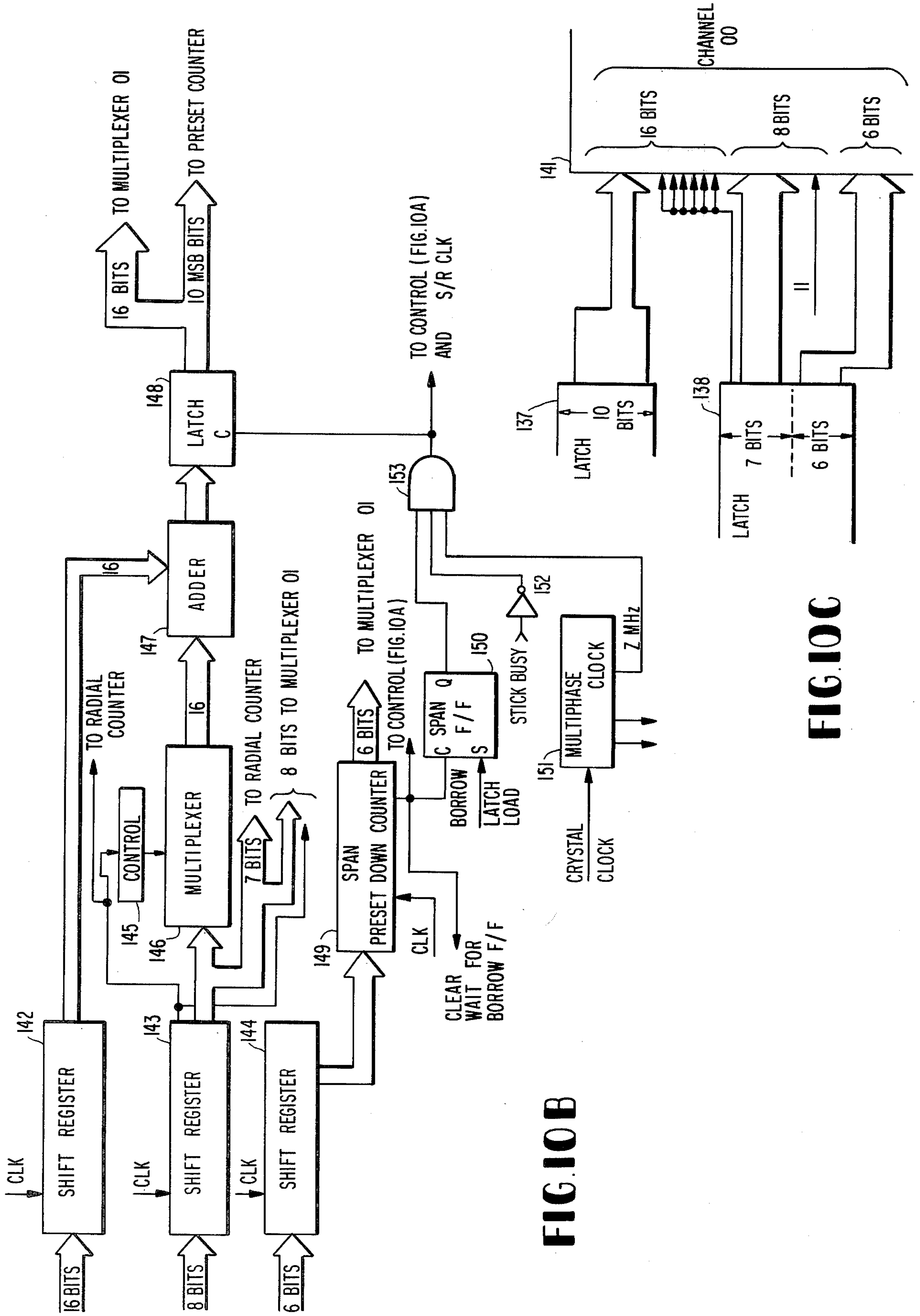

FIGS. 10A and 10B illustrate the processor which acts on the compressed data read from the memory and produces the display control signals.

The memory output bus 73 is coupled to a decoder 136 and latches 137 and 138. More particularly, bits 1 and 2 (the ID bits of the word read out of the memory) are coupled to the decoder 136. Bits 6–15 are coupled to latch 137 and bits 3–15 are coupled to latch 138. Decoder 136 has three outputs, one of which is high depending on which bit configuration is provided as an input. When the input bit configuration is 0, 0, identifying a range word, the corresponding output of decoder 136 is high, providing a load input to latch 137 which therefore loads 10 bits of range. When the ID bit configuration is 0, 1 or 1, 1, defining a velocity and span word for the non-radial case or a length and span word in the radial case, the corresponding output of decoder 136 is high providing a load input to the latch 138; thus, bits 3–15 are stored therein. The same output also sets flip-flop 139 providing the WAIT FOR BORROW signal, and the span flip-flop 150 (see FIG. 10B).

Reading terminates with WAIT FOR BORROW going high. If, on the next clock cycle, which steps the shift register, BORROW is produced when span counter 149 decrements the span word, two events occur. Gate 153 is disabled, halting further stepping of the shift registers. Flip-flop 139 is reset, and thus WAIT FOR BORROW goes low. This enables further reading, and when the next load signal is given to latch 138 the flip-flop 139 is set (terminating further memory readout) and flip-flop 150 is set enabling gate 153 to allow further cycling of the shift registers. This alternate operation of reading and shifting continues until either WAIT FOR ACP goes high (corresponding to reading of the next azimuth header) or BORROW is not produced (indicating a lack of space in the shift registers for further data). In the first case, succeeding shift register stages are cleared and in the latter case, the shift registers are recycled until BORROW is again produced.

The outputs from latches 137 and 138 are provided as part of the channel 00 input to a multiplexer 141. This arrangement is detailed in FIG. 10C. As there illustrated, the 10 bits of latch 137 are provided as part of a 16 bit word to the channel 0, 0 input. The other 6 bits of this word comprise the sign of the 7 bit velocity word duplicated 6 times.

A second input word for channel 0, 0 of the multiplexer 141 comprises the 7 bits of the velocity word, from latch 138 along with the 1, 1 output of decoder 136.

The third input word to channel 0, 0 of the multiplexer 141 comprises a 6 bit word comprising the lower 6 bits stored in the latch 138, i.e., the span word.

Multiplexer 141 has another input, a channel 1, 0 input, which is configured identical to the channel 0, 0 input except that each of its input lines are grounded.

Finally, a channel 0, 1 input is provided at the multiplexer 141 comprising, as is illustrated, a 16 bit word from latch 148 (see FIG. 10B) and 8 bit word from a shift register 143 (see FIG. 10B) and finally, a 6 bit word from the span counter 149 (see FIG. 10B).

The particular channel input selected by the multiplexer is determined by the control 140 which has applied to it the WAIT FOR BORROW signal, the BORROW signal from the span downcounter 149, as well as a gated clock. With WAIT FOR BORROW and BORROW low, channel 0, 0 is selected (load new data). When BORROW goes high, data is recirculated (channel 0, 1) and when WAIT FOR BORROW goes high, channel 1, 0 is selected.

The channel 0, 1 input to multiplexer 141 and the shift registers 142–144 (see FIG. 10B) to which the multiplexer 141 output is connected and from which its channel 0, 1 input is provided constitute a recirculating path. The various data words are recirculated and modified in accordance with the previously explained equations. When a data entity, corresponding to an indicia segment has been recirculated until the end point is reached, it is eliminated and a new data entity, relating to a new indicia segment, may be inserted.

When the first two words are loaded, they are coupled respectively to shift registers 142, 143 and 144 (see FIG. 10B).

Memory readout continues until the next ACP word is read. This terminates the operation by raising WAIT FOR ACP. Span flip-flop 150 is set by the same signal which sets flip-flop 139. The Q output of the span flip-flop 150 is provided as one input to an AND gate 153, another of whose inputs is provided by the multiphase clock, at a 2 MHz rate. The third input to the gate 150 is STICk BUSY, inverted by inverter 152. As will become clear hereinafter, this signal will be low and thus the gate will be enabled to pass the clock pulses, which are supplied to the control 140 and are supplied as clocking signals to the shift registers 142–144. As has been discussed, the gate 153 and flip-flop 139 are alternately enabled and cleared to read and shift new data from the memory.

The shift registers store, at a corresponding location, the range, span and slope for an indicia segment. The number of stages in the shift registers determine how many points on a single radial sweep can be illuminated. In one embodiment, 24 stages were suggested although this number can be varied to suit user needs. It is not necessary to employ the same number of words in a memory between ACP pulses because the system is arranged to load zeroes into the unused shift register locations through channel 1, 0. The output of shift register (range) 142, 16 bits wide, is provided as one input to a 16 by 16 adder 147. The other input to this adder is provided by the output of a multiplexer 146 which is operated by a control 145. The inputs to both the control 145 and multiplexer 146 are provided by the output of the shift register 143. The shift register 143 stores the velocity word (i.e., slope) and one bit determines whether or not the corresponding indicia segment relates to a radial indicia or not. The 8th bit output of shift register 143 representing this condition is provided to the control 145 and also to a radial counter (see FIG. 11A). In the non-radial case, the multiplexer 146 takes the 7 bit input from the shift register 143 and extends the sign bit to fill a 16 bit field which is provided as the input to the adder 147. The 16 bit input to the adder 147 from the shift register 142 consists of 10 bits of range information and 6 extended sign bits, and is interpreted as having an implied binary point to the right of the 10 bits of range information. The adder 147 adds the 7 bits of slope information such that the range is incremented by the 6 magnitude bits (in the least significant bit locations) of the velocity word. In some cases, this will cause a value change in the 10 most significant bits of the range word provided to the adder, and in other cases it will not. In any event, the output is coupled to latch 148 which is also clocked by the gate 153. Latch 148 provides its 10 most significant bits to a counter 154 (see FIG. 11A) and also supplies all 16 bits to the multiplexer channel 0, 1 input (see FIG. 10A).

Seven bits, of the 8 bit output of shift register 143, are provided to the radial counter (FIG. 11A) and all 8 bits of the shift register output are provided as an input to the multiplexer 141 0, 1 channel.

The output of the shift register (span) 144 is provided as an input to a preset downcounter 149, which is clocked at the same rate as the shift register. Thus, as the shift registers are clocked, the range information in shift register 142 is modified by the velocity (or slope information) in shift register 143 and the modified range information is coupled back to the multiplexer for reinsertion into the shift register (range) 142. On the other hand, the velocity (or slope) word is recirculated unchanged. The span count, coupled into the downcounter 149 is decremented by one count and then reinserted through the multiplexer back into shift register 144. At the same time, the output of latch 148, containing the modified range word, presents the 10 most significant bits to the up/down counter 155 (see FIG. 11A).

Generation of the BORROW signal signifies that the span has been completed. The BORROW signal clears the flip-flop 150 and momentarily disables the clock to the shift registers through AND gate 153. The BORROW signal also clears the WAIT FOR BORROW flip-flop 139 and enables the memory to read a new record, unless WAIT FOR ACP is high. In that case, the shift register location is nulled. The control 140 (FIG. 10A) is switched to enable a new word read from the memory to be inserted into the shift registers through channel 0, 0 of the multiplexer. Once the new word is inserted, the WAIT FOR BORROW flip-flop 139 and span flip-flop 150 become set, thus re-enabling the clock to the shift registers 142–144. In the point mode, that is, where a non-radial line is to be written, the 10 bits set into the counter 155 are coupled to the 10 bit bus 89 for entry into the scratch pad memory in the manner previously mentioned.

In the radial mode, the radial control bit, coupled to the control 145, controls a different input configuration to the multiplexer 146. In this case, the 7 bits of velocity information from shift register 143 are inserted in bits 6–12, the first 6 bits are grounded and the upper 3 bits are extended sign information. In this mode, the 7 bits of data represent a length and not a velocity. This length is summed in adder 147 and the latch 148 makes the 16 bit output available to the multiplexer 141 (channel 0, 1) for reinsertion into shift register 142 and also provides the 10 most significant bits to the preset counter 155. At the same time, the 7 bits of radial length, from shift register 143 are provided to the counter 154 and the radial flag bit is provided as one input to an AND gate 156. The sign associated with the radial length determines whether counter 154 will count up or down and the same bit, inverted by inverter 157, determines if the counter 155 will count up or down.

When counter 154 is preset, flip-flop 158 is set providing a high input to an AND gate 159. The gate 160 provides a clocking input from high speed oscillator 161 to gates 156 and 159. When gates 156 and 159 are enabled, high speed clock pulses from the oscillator 161 clock the counter 154 and the flip-flop 158 is cleared. Simultaneously, the same high speed clock pulses clock the counter 155 providing new data on the bus 89, on each clock pulse a different address is provided by the counter 155 to bus 89 and thus a 1 bit is written into the corresponding range cell. As this operation continues, "one" bits are written into a continuous range of range cells until the counter 154 produces a BORROW which closes the gate 160 and terminates the operation.

Thus, in the point mode, for each record in the registers 142–144, on each cycle through the shift registers the range count is modified by the velocity information and the modified range count is inserted into the shift register, the velocity information is reinserted and the span count is decremented by one count and inserted. Each new range count corresponds to a bit on the display at the corresponding range address. This operation is completed when the span count is decremented to zero at which time the words are eliminated.

In the radial mode, a radial line is written beginning at the point located by the range address and which has a length corresponding to the length stored in the shift register 143 at the corresponding word. This operation also continues until the span count is down counted to zero at which time the words are eliminated.

On each new ACP count, the apparatus determines whether new words are available for insertion into the shift register, and if available, they are so inserted.

Referring now to FIG. 12, the foregoing discussion describes how data corresponding to the indicia intersections with the range sweep are loaded into different ones of the scratch pad memories.

Typically, the shift registers cycle once per ACP change. After the new data has been read and unused locations are cleared the failure to produce BORROW by counter 149 terminates shift register cycling until the new ACP count drops the WAIT FOR ACP signal to allow reading of new data.

Since the display controlling scratch pad memory is read out by the range clock, the environmentally generated signals, when mixed with the scratch pad memory readout are displayed in a coordinated display wherein the environmentally generated signals can be interpreted with regard to the indicia which are written on the display. The foregoing function has been accomplished with a storage arrangement which reduces the storage requirement. More particularly, each indicia segment is written on the display as driven by the memory which stores only two words for the segment. This is accomplished by the processing performed by the apparatus shown in FIG. 10A, 10B and 11A. Furthermore, the display functions can proceed quite independently of the processing since a scratch pad memory is always available with appropriate data to control the display. A typical display will generate many sweeps between ACP changes. Once the data has been processed and the appropriate SPM loaded the apparatus of FIGS. 10A and 10B merely awaits the new ACP while the written SPM controls each display sweep, as it is generated.

What is claimed is:

1. In a display system for displaying signals representing an environment external thereto, said display system including a CRT display with a deflection means for sweeping a cathode ray beam over said CRT display in a predetermined pattern with means for controlling unblanking of said beam for creating visible manifestations on said CRT display, an indicia generator for providing signals to said means for controlling unblanking of said beam to write indicia on said CRT display concurrently with manifestations of said environmental signals and coordinated therewith in which said indicia generator is driven by data in compressed form comprising:

storage means for storing parameters related to said indicia including coordinates of a point on said indicia, a slope for said indicia and a length for said indicia, and first means responsive to said stored parameters and to beam position in said pattern for producing signals to control unblanking of said beam to write indicia corresponding to said stored parameters.

2. The apparatus of claim 1 wherein said first means includes arithmetic means responsive to said stored parameters for computing coordinates of said indicia other than said stored coordinates.

3. The apparatus of claim 2 in which said deflection means sweeps said beam in a pattern in Cartesian coordinate system.

4. The apparatus of claim 2 in which said deflection means sweeps said beam in a pattern in a polar coordinate system.

5. The apparatus of claim 2 in which said indicia generator is capable of displaying multiple overlapping indicia and in which:

said storage means stores for each of said multiple indicia coordinates of a point on each of said indicia, a slope and length for said indicia, said apparatus further including means including plural scratch pad memories coupled to said arithmetic means to store data representing intersections of indicia with a succeeding scan of said deflection means, said plural scratch pad memories including read out circuits driven by said deflection means for readout synchronous with beam deflection.

6. The apparatus of claim 5 which further includes scratch pad memory control means for selectively and sequentially enabling scratch pad reading, writing and clearing of each of said scratch pad memories.

7. The apparatus of claim 5 in which said storage means stores slope data as a first derivative of said indicia with respect to one coordinate of said deflection sweep, and in which said arithmetic means modifies at least one stored coordinate of said indicia by use of said slope.

8. The apparatus of claim 5 in which said first means also includes:

a further memory with storage for range, slope and span data for plural indicia, means for reading from said storage means and for writing from said storage means to said further memory, said arithmetic means sequentially responsive to different range words and slope words in said further memory for algebraically adding said slope and range words, said arithmetic means simultaneously responsive to an associated span word for decrementing the same, and control means for sequentially rewriting into said further memory said slope word, the range word and span word as modified by said arithmetic means unless said span word as decremented is less than a predetermined value.

9. The apparatus of claim 8 in which said further memory comprises three plural stage shift registers.

10. The apparatus of claim 8 in which said storage means stores in sequential locations, an azimuth word, and following said azimuth word parameters for indicia commencing at said azimuth and in which said means for reading from said storage means includes a memory address counter clocked at a predetermined rate, control means for enabling said memory address counter, said control means including a comparator with two inputs and an output, one said input provided with signals relating to antenna azimuth, a latch coupled to said other input for storing an azimuth word read from said storage means, said control means enabling said memory address counter when said comparator indicates antenna azimuth corresponds to said azimuth word.

11. The apparatus of claim 10 in which said control means further includes means for inhibiting said memory address counter unless said arithmetic means has decremented a span word to less than said predetermined value.

12. The apparatus of claim 11 in which said further memory comprises a plurality of plural stage shift registers, a multiplexer with plural input channels and an output coupled to said shift registers, one said input connected to receive data read from said storage means, a second said input connected to said shift registers, and a third said input connected to provide null data to said shift registers, said control means controlling said multiplexer, to couple said first input to said output when data is read from said storage means, to couple said second input to said output when data is not being read and said arithmetic means has not decremented a span word to less than said predetermined value, and to couple said third input to said output when data is not being read and said arithmetic means has decremented a span word to less than said predetermined value.

13. A compressed data indicia generator for use with a display system to manifest visible fixed indicia concurrently and in coordination with visible manifestations of information bearing signals received by an antenna in which said display system includes a writing beam scanned over a display field by a deflection system in a predetermined pattern with a beam unblanking means for creating said manifestations, the indicia generator comprising:

a mixer for mixing information bearing signals with an output representing said indicia for controlling said beam unblanking means, storage means storing data defining said indicia including at least coordinates of one point on said indicia and a slope and length of said indicia, and first means coupled to said storage means and to said deflection system and providing indicia signals to said mixer for writing said indicia.

14. The apparatus of claim 13 in which said first means further includes, arithmetic means responsive to said stored data and coupled to said first means, for computing coordinates of said indicia other than said stored coordinates.

15. The apparatus of claim 14 which further includes:
a range clock for controlling said deflection system, said first means comprising
means including plural scratch pad memories into which said arithmetic means writes information representing said coordinates, at least one said scratch pad memory coupled to said range clock at any time for reading out information stored therein to said mixer.

16. The apparatus of claim 15 in which
said plural scratch pad memories include three such memories, addressing means for each of said memories, means coupling said range clock to two said memories for reading out data from one of said two memories to said mixer, for nulling all locations of said other of said two memories as each location is addressed by said range clock,
and means coupling said arithmetic means to said third memory for writing new data therein as provided by said arithmetic means.

17. The apparatus of claim 14 in which said storage means stores an azimuth word followed by indicia parameters for indicia beginning at said azimuth and said first means includes
plural shift registers a different such register storing range words, slope words and span words,
loading means for loading said shift registers from said storage means, said loading means including
a multiplexer having an input connected to said storage means and an output connected to said shift registers,
addressing means for said storage means including a register for storing an azimuth word read from said storage means, an address counter clocked at a constant rate and control means for inhibiting said address counter if antenna azimuth does not correspond to said azimuth word in said register.

18. The apparatus of claim 17 in which said control means includes,
a comparator comparing antenna azimuth with said azimuth word in said register,
bistable circuit means coupled to said comparator and set to one position each time an azimuth word is loaded into said register and reset each time said comparator detects correspondence,
said control means inhibiting said addressing counter when said bistable circuit means is set.

* * * * *